Jan. 7, 1958    J. M. HART    2,818,746
FLIGHT CONTROLS MIXING LEVER
Filed Aug. 12, 1955

INVENTOR.
Jack M. Hart
BY
ATTORNEYS

United States Patent Office

2,818,746
Patented Jan. 7, 1958

2,818,746

FLIGHT CONTROLS MIXING LEVER

Jack M. Hart, Lockport, N. Y., assignor, by mesne assignments, to the United States of America as represented by the Secretary of the Navy Application August 12, 1955, Serial No. 528,140

12 Claims. (Cl. 74—480)

The present invention relates to a multi-rotor helicopter control system, and more particularly to a means for combining a plurality of input signals in order to obtain a desired plurality of output control signals to actuate the various movable airfoil surfaces of the helicopter.

The usual flight control system of a multi-rotor helicopter is a positive mechanical type with control tubes, bell cranks, idlers and mixing levers operated by conventional helicopter controls. The pilot flies the helicopter by actuating the usual foot pedals, sticks, and other movable control inputs. According to the instant invention, these inputs are transmitted through control tubes and bell cranks to a mixing lever system which mixes or combines various control inputs and in turn transmits output signals through control tubes and bell cranks to the links that incline the swash plates, raise and lower the collective pitch sleeves and perform other functions to control the cyclic pitch and collective pitch of the helicopter rotors.

Accordingly, it is an object of this invention to provide an improved mixing lever system to mix the controls on a multi-rotor so that the same set of controls can serve several functions independently of each other.

A particular object of this invention is to provide a mixing lever assembly wherein the collective pitch of the fore and aft rotor may be adjusted equally and simultaneously.

Another object is to provide a mixing lever assembly wherein the trim actuator will simultaneously move the collective pitch outputs to the fore and aft rotors in opposite directions.

Another object is to provide a mixing lever assembly wherein actuation of the fore and aft cyclic pitch input will cause the collective pitch outputs to the fore and aft rotors to move in opposite directions.

Another object is to provide a mechanical movement having a plurality of inputs and a plurality of outputs wherein two of said outputs can be caused to move simultaneously in one direction or simultaneously in opposite directions.

Figure 1:
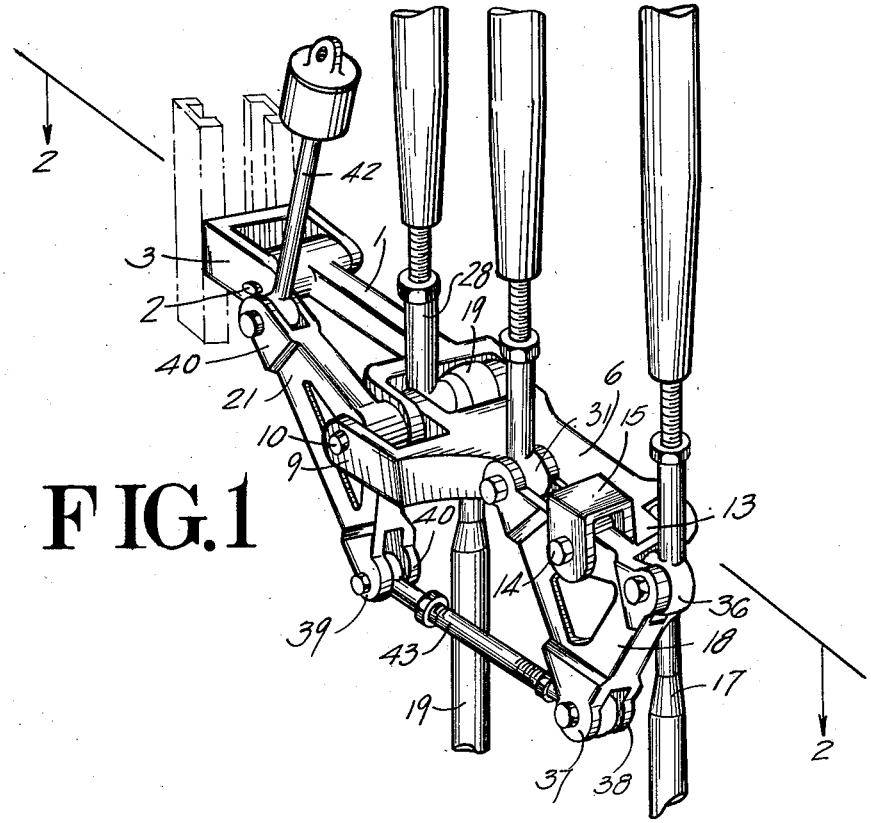
Figure 2:
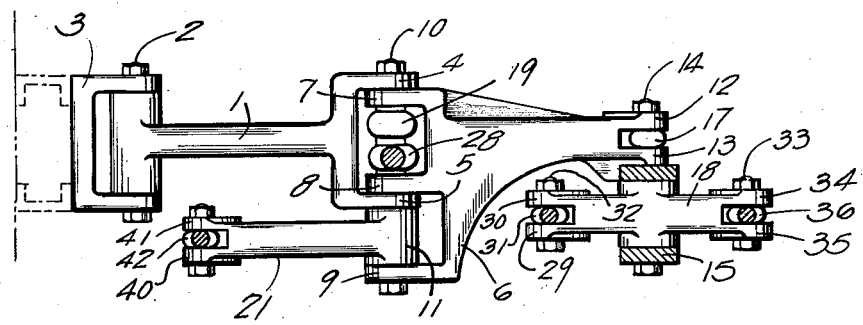

The specific nature of this invention as well as other objects and advantages thereof will clearly appear from a description of a preferred embodiment as shown in the accompanying drawings in which:

Figure 1 is a perspective view of the mixing lever means of the instant invention; and Figure 2 is a view of the upper portion of the mixing lever means taken on the plane indicated by line 2—2 of Figure 1.

Referring to Figures 1 and 2, the mixing lever assembly comprises a mixing lever support arm or link 1, pivoted by pivot pin 2 to support bracket 3. Bracket 3 is preferably fixed to the port frame structure of the helicopter. The other end of mixing levers support arm 1 is bifurcated to provide extensions 4 and 5 for receiving cross link 6. Cross link 6 is furcated to provide extensions 7, 8 and 9.

As viewed in Figure 2, a single pivot pin 10 pivots one end of mixing lever support arm 1 to cross link 6 and to end portion 11 of forward and aft cyclic pitch mixing triangular bell crank 21. Extensions 7 and 8 are received by extensions 4 and 5, and extensions 8 and 9 receive extension 5 and end portion 11 of triangular bell crank 21. Cyclic pitch input push pull tube 19, which is preferably actuated by a pilot's cyclic control stick through a bell crank lever, is pivoted on pivot pin 10 adjacent to extension 7 between extensions 7 and 8. Fore and aft cyclic pitch output push pull tube 28 is preferably pivoted on pivot pin 10 adjacent to extension 8 between extensions 7 and 8.

The other end of cross link 6 is bifurcated to provide extensions 12 and 13 for pivoting push pull tube 17 on pivot pin 14. Collective pitch input push pull tube 17 may be actuated by levers which are preferably mounted at the left side of the pilot's and co-pilot's seats. Extension 13 of cross link 6 is preferably provided with a transverse extension 15 for pivoting the center of one of the side portions of collective pitch mixing triangular bell crank 18 on pivot pin 14.

One end portion of collective pitch mixing lever bell crank 18 is provided with extensions 29 and 30 for pivoting the collective pitch output forward rotor push-pull tube 31 on pivot pin 32. A second end portion of collective pitch bell crank 28 is provided with pivot pin 33 mounted between extensions 34 and 35 for pivoting collective pitch aft rotor push pull tube 36 to bell crank 18.

A cross link 43 arranged parallel to cross link 6 is pivoted at one end thereof between extensions 37 and 38 on the lower end portion of bell crank 18. The other end of cross link 43 is pivoted between extensions 39 and 40 provided on an end portion of cyclic pitch bell crank 21. Another end portion of cyclic pitch bell crank 21 is provided with extensions 40 and 41 for pivoting therebetween trim input link 42.

*Operation*

In operation, the collective pitch control system is actuated by the pilot's levers. The levers move push pull tube 17 up or down. This rotates link 6 about pivot 10 thereby moving collective pitch outputs 31 and 36 in the same direction. Since cross link 6 and 43 plus the vertical legs of bell cranks 18 and 21 form a parallelogram, collective pitch output tubes 31 and 36 move equally and parallel. Therefore the pitch of the rotor blades of each rotor is increased or decreased simultaneously and equally.

Actuation of corrective trim input link 42 rotates bell crank 21 about pivot 10 thereby moving link 43 and rotating bell crank 18 about pivot 14 to move the collective pitch outputs 31 and 36 in opposite directions. Hence, the trim of the aircraft is controlled.

When cyclic pitch input push pull tube 19 is actuated by the pilot's cyclic control stick, mixing levers support arm 1 is rotated about pivot 2 thereby displacing bell crank 21, moving cross link 43, rotating bell crank 18 about pivot 14, and moving collective pitch output push-pull tubes 31 and 36 in opposite directions. This also causes a movement of corrective trim link 42.

Obviously many modifications and variations of the present invention are possible in the light of the above teachings. It is therefore to be understood that within the scope of the appended claims, the invention may be practiced otherwise than as specifically described.

What is claimed is:

1. A flight controls mixing means for a two rotor helicopter comprising a first triangular bell crank, a first link pivoted at one of its ends to a first end portion of said first triangular bell crank, a second triangular bell crank pivoted at the center of one of its side portions to the other end of said first link, a second link parallel to the first link pivoted at one of its ends to a second end portion of said first triangular bell crank and at its other end to a first end portion of said second triangular bell crank, a third link pivoted at one of its ends to the frame of the helicopter and at its other end to the first end portion of said first triangular bell crank, output linkage to control the collective pitch of the fore helicopter rotor pivoted to a second end portion of said second triangular bell crank, output linkage to control the collective pitch of the aft helicopter rotor pivoted to a third end portion of said second triangular bell crank, output linkage to control the fore and aft helicopter rotors cyclic pitch pivoted to the first end portion of said first triangular bell crank, collective pitch input linkage pivoted to the center of the side portion of the second triangular bell crank for moving the fore and aft collective pitch output linkages equally and parallel, corrective trim input linkage pivoted to the third end portion of said first triangular bell crank for rotating said first bell crank, moving said second link and rotating said second bell crank to thereby move the fore and aft collective pitch output linkages in opposite directions, and fore and aft cyclic pitch input linkage pivoted to the first end portion of said first triangular bell crank for displacing said first bell crank, moving said second link, and rotating said second bell crank to thereby move the fore and aft collective output linkages in opposite directions.

2. A mechanical movement comprising a first triangular bell crank, a first link pivoted at one of its ends to a first end portion of said first triangular bell crank, a second triangular bell crank pivoted at the center of one of its side portions to the other end of said first link, a second link parallel to the first link pivoted at one of its ends to a second end portion of said first triangular bell crank and at its other end to a first end portion of said second triangular bell crank, a third link pivoted at one of its ends to a fixed mounting means and at its other end to the first end portion of said first triangular bell crank, a first output pivoted to a second end portion of said second triangular bell crank, a second output pivoted to a third end portion of said second triangular bell crank, a third output pivoted to the first end portion of said first triangular bell crank, a first input pivoted to the center of the side portion of the second triangular bell crank for moving the first and second outputs equally and parallel, a second input pivoted to the third end portion of said first triangular bell crank for rotating said first bell crank moving said second link and rotating said second bell crank to thereby move the first and second outputs in opposite directions, and a third input pivoted to the first end portion of said first triangular bell crank for actuating said third output and displacing said first bell crank, moving said second link, and rotating said second bell crank to thereby move the first and second outputs in opposite directions.

3. A flight controls mixing means for a two rotor helicopter comprising a first triangular bell crank, a first link pivoted at one of its ends to a first end portion of said first triangular bell crank, a second triangular bell crank pivoted at the center of one of its side portions to the other end of said first link, a second link parallel to the first link pivoted at one of its ends to a second end portion of said first triangular bell crank and at its other end to a first end portion of said second triangular bell crank, output linkage to control the collective pitch of the fore helicopter rotor pivoted to a second end portion of said second triangular bell crank, output linkage to control the collective pitch of the aft helicopter rotor pivoted to a third end portion of said second triangular bell crank, and collective pitch input linkage pivoted to the center of the side portion of the second triangular bell crank for moving the fore and aft collective pitch output linkages equally and parallel.

4. A mechanical movement comprising a first triangular bell crank, a first link pivoted at one of its ends to a first end portion of said first triangular bell crank, a second triangular bell crank pivoted at the center of one of its side portions to the other end of said first link, a second link parallel to the first link pivoted at one of its ends to a second end portion of said first triangular bell crank and at its other end to a first end portion of said second triangular bell crank, a first output pivoted to a second end portion of said second triangular bell crank, a second output pivoted to a third end portion of said second triangular bell crank, and an input pivoted to the center of the side portion of the second triangular bell crank for moving the first and second outputs equally and parallel.

5. A flight controls mixing means for a two rotor helicopter comprising a first triangular bell crank, a first link pivoted at one of its ends to a first end portion of said first triangular bell crank, a second triangular bell crank pivoted at the center of one of its side portions to the other end of said first link, a second link parallel to the first link pivoted at one of its ends to a second end portion of said first triangular bell crank and at its other end to a first end portion of said second triangular bell crank, a third link pivoted at one of its ends to the frame of the helicopter and at its other end to the first end portion of said first triangular bell crank, output linkage to control the collective pitch of the fore helicopter rotor pivoted to a second end portion of said second triangular bell crank, output linkage to control the collective pitch of the aft helicopter rotor pivoted to a third end portion of said second triangular bell crank, and collective pitch input linkage pivoted to the center of the side portion of the second triangular bell crank for moving the fore and aft collective pitch output linkages equally and parallel.

6. A mechanical movement comprising a first triangular bell crank, a first link pivoted at one of its ends to a first end portion of said first triangular bell crank, a second triangular bell crank pivoted at the center of one of its side portions to the other end of said first link, a second link parallel to the first link pivoted at one of its ends to a second end portion of said first triangular bell crank and at its other end to a first end portion of said second triangular bell crank, a third link pivoted at one of its ends to the frame of the helicopter and at its other end to the first end portion of said first triangular bell crank, a first output pivoted to a second end portion of said second triangular bell crank, a second output pivoted to a third end portion of said second triangular bell crank, and an input pivoted to the center of the side portion of the second triangular bell crank for moving the first and second outputs equally and parallel.

7. A flight controls mixing means for a two rotor helicopter comprising a first triangular bell crank, a first link pivoted at one end of its ends to a first end portion of said first triangular bell crank, a second triangular bell crank pivoted at the center of one of its side portions to the other end of said first link, a second link parallel to the first link pivoted at one of its ends to a second end portion of said first triangular bell crank and at its other end to a first end portion of said second triangular bell crank, a third link pivoted at one of its ends to the frame of the helicopter and at its other end to the first end portion of said first triangular bell crank, output linkage to control the collective pitch of the fore helicopter rotor pivoted to a second end portion of said second triangular bell crank, output linkage to control the collective pitch of the aft helicopter rotor pivoted to a third end portion of said second triangular bell crank, output linkage to control the fore and aft helicopter rotors cyclic pitch pivoted to the first end portion of said first triangular bell crank, and collective pitch input linkage pivoted to the center of the side portion of the second triangular bell crank for moving the fore and aft collective pitch output linkages equally and parallel.

8. A mechanical movement comprising a first triangular bell crank, a first link pivoted at one of its ends to a first end portion of said first triangular bell crank, a second triangular bell crank pivoted at the center of one of its side portions to the other end of said first link, a second link parallel to the first link pivoted at one of its ends to a second end portion of said first triangular bell crank and at its other end to a first end portion of said second triangular bell crank, a third link pivoted at one of its ends to the frame of the helicopter and at its other end to the first end portion of said first triangular bell crank, a first output pivoted to a second end portion of said second triangular bell crank, a second output pivoted to a third end portion of said second triangular bell crank, a third output pivoted to the first end portion of said first triangular bell crank, and an input pivoted to the first end portion of said first triangular bell crank for actuating said third output and displacing said first bell crank, moving said second link, and rotating said second bell crank to thereby move the first and second outputs in opposite directions.

9. A flight controls mixing means for a two rotor helicopter comprising a first triangular bell crank, a first link pivoted at one of its ends to a first end portion of said first triangular bell crank, a second triangular bell crank pivoted at the center of one of its side portions to the other end of said first link, a second link parallel to the first link pivoted at one of its ends to a second end portion of said first triangular bell crank and at its other end to a first end portion of said second triangular bell crank, output linkage to control the collective pitch of the fore helicopter rotor pivoted to a second end portion of said second triangular bell crank, output linkage to control the collective pitch of the aft helicopter rotor pivoted to a third end portion of said second triangular bell crank, and corrective trim input linkage pivoted to the third end portion of said first triangular bell crank for rotating said first bell crank, moving said second link and rotating said second bell crank to thereby move the fore and aft collective pitch output linkages in opposite directions.

10. A flight controls mixing means for a two rotor helicopter comprising a first triangular bell crank, a first link pivoted at one of its ends to a first end portion of said first triangular bell crank, a second triangular bell crank pivoted at the center of one of its side portions to the other end of said first link, a second link parallel to the first link pivoted at one of its ends to a second end portion of said first triangular bell crank and at its other end to a first end portion of said second triangular bell crank, a third link pivoted at one of its ends to the frame of the helicopter and at its other end to the first end portion of said first triangular bell crank, output linkage to control the collective pitch of the fore helicopter rotor pivoted to a second end portion of said second triangular bell crank, output linkage to control the collective pitch of the aft helicopter rotor pivoted to a third end portion of said second triangular bell crank, and corrective trim input linkage pivoted to the third end portion of said first triangular bell crank for rotating said first bell crank, moving said second link and rotating said second bell crank to thereby move the fore and aft collective pitch output linkages in opposite directions.

11. A mechanical movement comprising a first triangular bell crank, a first link pivoted at one of its ends to a first end portion of said first triangular bell crank, a second triangular bell crank pivoted at the center of one of its side portions to the other end of said first link, a second link parallel to the first link pivoted at one of its ends to a second end portion of said first triangular bell crank and at its other end to a first end portion of said second triangular bell crank, a first output pivoted to a second end portion of said second triangular bell crank, a second output pivoted to a third end portion of said second triangular bell crank, and input linkage provided to the third end portion of said first triangular bell crank for rotating said first bell crank moving said second link and rotating said second bell crank to thereby move the first and second outputs in opposite directions.

12. A mechanical movement comprising a first triangular bell crank, a first link pivoted at one of its ends to a first end portion of said first triangular bell crank, a second triangular bell crank pivoted at the center of one of its side portions to the other end of said first link, a second link parallel to the first link pivoted at one of its ends to a second end portion of said first triangular bell crank and at its other end to a first end portion of said second triangular bell crank, a third link pivoted at one of its ends to the frame of the helicopter and at its other end to the first end portion of said first triangular bell crank, a first output pivoted to a second end portion of said second triangular bell crank, a second output pivoted to a third end portion of said second triangular bell crank, and input linkage pivoted to the third end portion of said first triangular bell crank for rotating said first bell crank moving said second link and rotating said second bell crank to thereby move the first and second outputs in opposite directions.

References Cited in the file of this patent

UNITED STATES PATENTS

| | | |
|---|---|---|
| 2,454,981 | Vint | Nov. 30, 1948 |
| 2,549,969 | Heseman | Apr. 24, 1951 |
| 2,603,033 | Sharp | July 15, 1952 |

FOREIGN PATENTS

| | | |
|---|---|---|
| 28,612 of 1902 | Great Britain | Dec. 24, 1903 |